No. 810,800. PATENTED JAN. 23, 1906.
A. C. PALMER.
HARROW.
APPLICATION FILED APR. 27, 1905.

Witnesses
Phil E. Barnes

Inventor
A. C. Palmer
By Victor J. Evans
Attorney

UNITED STATES PATENT OFFICE.

ANDREW C. PALMER, OF WASHINGTON, INDIANA.

HARROW.

No. 810,800.   Specification of Letters Patent.   Patented Jan. 23, 1906.

Application filed April 27, 1905. Serial No. 257,701.

*To all whom it may concern:*

Be it known that I, ANDREW C. PALMER, a citizen of the United States, residing at Washington, in the county of Daviess and State of Indiana, have invented new and useful Improvements in Harrows, of which the following is a specification.

This invention relates to harrows of the rotary type, and has for its objects to produce a comparatively simple inexpensive device of this character by which the breaking and harrowing of the ground will be rapidly and efficiently performed, one wherein the harrowing teeth or blades may be readily removed from or replaced upon the cylinder when circumstances require, and one wherein the teeth will be maintained in firm secure position upon the cylinder or drum.

With these and other objects in view the invention comprises the novel features of construction and combination of parts more fully hereinafter described.

Figure 1:
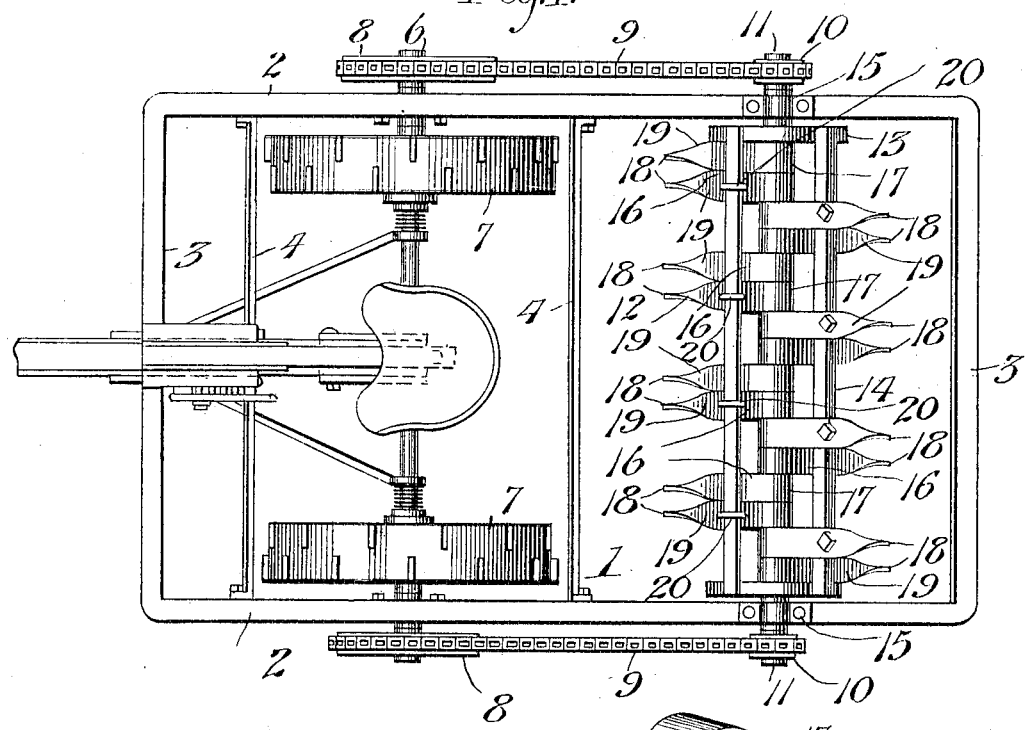
Figure 2:
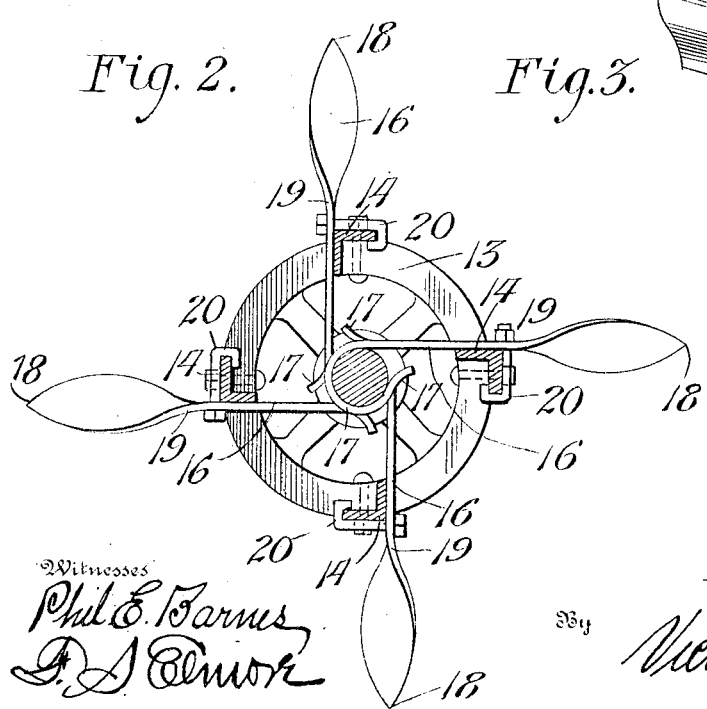
Figure 3:
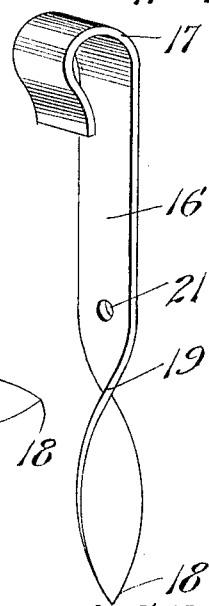

In the accompanying drawings, Figure 1 is a top plan view of a harrow embodying the invention. Fig. 2 is a detail end view, partly in section, of the tooth or blade carrying drum. Fig. 3 is a perspective view of one of the blades.

Referring to the drawings, 1 designates a frame composed of angle-iron or other suitable material and comprising side bars 2 and front and end bars 3, there being bolted within the frame at suitably-spaced intervals and at intermediate points transverse braces 4, while bolted to the side bars 2 are bearings 5, adapted to receive for rotation a drive-shaft 6, which extends transversely of the frame 1 at a point centrally between the braces 4 and is equipped with ground-wheels 7. Fixed on the outer ends of the shaft 6 are sprocket-wheels 8, connected by chains 9 with sprocket-pinions 10, in turn fixed upon the shaft 11 of a drum 12, which latter comprises in its organization a pair of annular heads 13, fixed in any appropriate manner upon the shaft 11, and a plurality of, preferably four, bars or webs 14, composed of angle-iron and having their ends bolted or otherwise secured to the heads 13, the bars being arranged at diametrically-opposed points relative to the heads and the central shaft 11 being journaled for rotation in suitable bearings 15 on the side bars 2. Carried by the drum 12 is a series of teeth or blades 16, each formed from a single piece of metal, as shown in Fig. 4, and having at its normally inner end a spring-engaging portion or hook 17 and at its outer end an active or cutting portion 18, disposed in a plane at right angles to the plane of the body of the tooth 16, which latter for this purpose is during its formation given a half-turn at the point 19. The teeth are secured upon the drum by engaging the portions or hooks 17 with the central shaft 11 and securing the body of the blades to the respective webs or angle-bars 14 by means of clip-bolts 20, entered through openings 21, formed in the blades, it being apparent from this arrangement that when the blades in practice become worn or otherwise defective they may be readily detached for replacement by new ones.

In practice as the machine advances over the ground the drum-shaft 11 will be driven from the main shaft 12 through the medium of the chain-and-sprocket gearing, it being obvious that owing to the relative sizes of the wheels 8 and pinions 10 the drum will rotate at a comparatively high rate of speed relative to the shaft 6, thus to effect a thorough and rapid breaking and harrowing of the ground, and, further, that the speed of the drum may be varied by varying the sizes of the gears and pinions, as will be readily understood. Further, it will be observed that the teeth 16 will, owing to the improved manner of attaching them to the drum, be maintained firmly in place and will in practice, through their hooked portions 17 engaging the shaft 11, assist materially in bracing and supporting the drum as a whole upon the latter.

From the foregoing it is apparent that I produce a simple inexpensive device admirably adapted for the attainment of the ends in view, it being understood that minor changes in the details herein set forth may be resorted to without departing from the spirit of the invention.

Having thus described my invention, what I claim is—

1. In a device of the class described, a drum comprising a central shaft, end heads fixed thereon and webs attached to the heads, cutting members having portions for engagement with the central shaft, and means for attaching the cutting members to the webs.

2. In a device of the class described, a rotary drum comprising a central shaft, end heads, and a plurality of webs attached to said heads, blades having spring-engaging portions for engagement with the central drum-shaft, and means for attaching the blades to the webs.

3. In a device of the class described, a rotary drum comprising a central shaft, end heads fixed thereon, and a plurality of webs attached to the heads, cutting members having their inner ends engaged with the central shaft, and clip-bolts for attaching the members to the webs.

4. In a device of the class described, a rotary drum comprising a central shaft, end heads and a plurality of webs attached to said heads, blades provided with hooked end portions engaging the shaft, and clip-bolts for attaching the blades to the webs.

In testimony whereof I affix my signature in presence of two witnesses.

ANDREW C. PALMER.

Witnesses:
  MILTON S. HASTINGS,
  JOSIAH G. ALLEN.